Dec. 30, 1952        R. K. SHEWMON        2,623,979
MOTOR CONTROL DEVICE
Filed July 1, 1950

INVENTOR
RALPH K. SHEWMON

BY
HIS
ATTORNEYS

Patented Dec. 30, 1952

UNITED STATES PATENT OFFICE 2,623,979

MOTOR CONTROL DEVICE

Ralph K. Shewmon, Dayton, Ohio, assignor to General Motors Corporation, Detroit, Mich., a corporation of Delaware Application July 1, 1950, Serial No. 171,583

5 Claims. (Cl. 219—39)

This invention relates to improvements in control devices for electrical circuits and particularly circuits including the starting and running windings of an electric motor and also the heater for a drying machine in which the motor drives an air circulating device.

It is among the objects of the present invention to provide an automatic control device for a drying machine having an electric heater coil and a motor driven fan for circulating heated air within the machine, said control device being operative to render the heater coil active and the starting winding of the motor ineffective while the motor is operating at proper speed, said device rendering the heater coil inactive and the starting winding effective when the speed of the motor drops below a predetermined rate.

A further object of the present invention is to provide a protective device in circuit with the running and starting windings of the electric motor, said device interrupting the motor circuits and rendering the electric motor completely inoperative in response to abnormal motor conditions caused by overload, short circuits or any other abnormality which would effect proper operation of the electric motor.

Further objects and advantages of the present invention will be apparent from the following description, reference being made to the accompanying drawings, wherein a preferred embodiment of the present invention is clearly shown.

Figure 1:
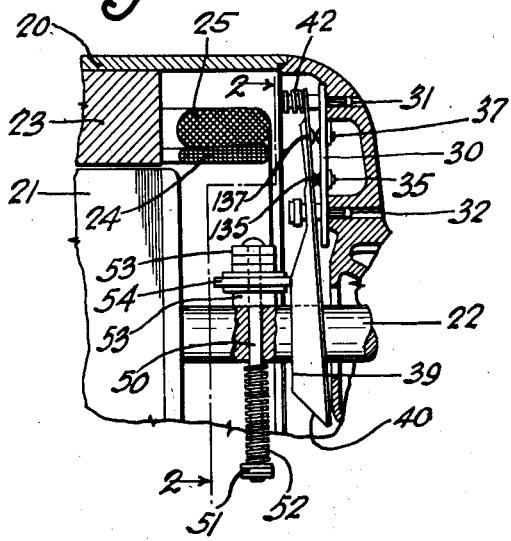
Fig. 1 is a fragmentary, sectional view of an electric motor equipped with the present invention.

The control device for the electric motor disclosed in the present invention is of the type illustrated, described and claimed in the patent to C. J. Werner, 2,182,977, issued December 12, 1939. In the present invention it performs a dual function, first it controls the starting winding of the electric motor, rendering said winding effective only for starting purposes and ineffective when the motor has reached and is operating at a predetermined speed, and second it renders the heating coil of the drying machine in which the motor is used, ineffective while the motor is operating below proper speed or is completely stopped and effective only when the motor is operating at the proper predetermined speed to drive the circulating fan.

Referring to the drawings, the motor 20 has a rotor 21 carried by shaft 22, and a stator 23 provided with running winding 24 and starting winding 25. The shaft 22 of the motor 20 is attached to and drives a fan 26 for circulating heated air in the drying machine in which the motor is used.

Figure 2:
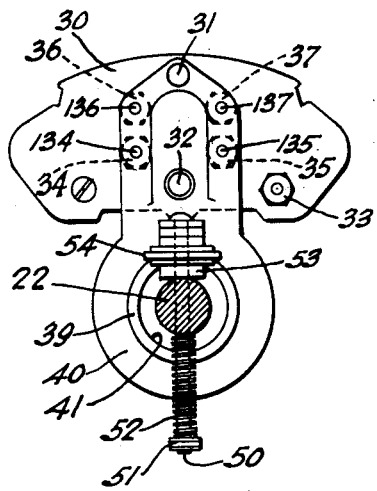
Fig. 2 is a view taken along the line and in the direction of the arrows 2—2 of Fig. 1.

The control device or switch comprises an insulating base plate 30 secured in the motor by pins 31 and 32 insulated from the motor housing in any suitable manner. Base plate 30 has a terminal post 33. Four stationary terminal contacts 34, 35, 36 and 37 are carried by the base plate 30, these terminal contacts being so arranged that, as shown in dotted lines in Fig. 2, contact 34 will align and be engageable by the contact point 134 on the movable bridging member 38, 35 by contact point 135, 36 by contact point 136 and 37 by contact point 137. Fig. 1 shows terminal contacts 35 and 37 on plate 30 and contacts points 135 and 137 on the movable bridging member 38.

The end of movable bridging member 38 of the switch, opposite the flat end upon which contact points 134, 135, 136 and 137 are attached is disc-shaped and dished providing a flat portion 39 and a conical portion 40. The flat portion is apertured as at 41, the motor shaft 22 extending through said aperture when the switch is assembled in the motor housing, the aperture being substantially larger in diameter than the shaft to assure free movement of the member 38 and avoid any grounding contact of it with said shaft. A spring 42 is interposed between the head of pin 31 and the member 38, said spring constantly urging member 38 to move clockwise (Fig. 1) about either of the pair of engaging contacts 33—136 or 37—137 when acting as the fulcrum. Pin 32, also insulated from the motor housing in which it is anchored, extends through an aperture in member 38 and has a head portion which engages member 38 to limit its movement under the influence of spring 42.

The motor driven mechanism for actuating member 38 comprises a rod 50, slidably extending through a transverse opening in the shaft 22, one end of rod 50 having a head 51. A spring 52, surrounding rod 50 engages the head 51 and shaft 22, yieldably urging the inner of a series of weight washers 53, immovably secured to rod 50 on the side of shaft 22 opposite spring 52, against said shaft: a washer 54, substantially larger in diameter than the washers between which it is clamped, is made of any suitable fibrous material such as felt or the like, and is engaged constantly by the dish-shaped, disc portion of the member 38 under the pressure of spring 42. As shown in Fig. 1, when the motor is not operating, the centrifugal mechanism and particularly felt washer 54 is engaged by the flat annular face 39 of member 38, thus member 38, pivoted about engaging contacts 34—134 and 35—135 compresses spring 42 and contacts 136—137 are disengaged from their respective cooperating stationary contacts 36—37.

When the motor starts to operate and rotate the centrifugal mechanism mounted on shaft 22, the weights 53 on rod 50 will move radially outwardly due to centrifugal force and against the effect of spring 52 and thus member 38 may rotate clockwise about contacts 34—134 and 35—135 acting as the fulcrum, under the effect of spring 42. At a predetermined motor speed the felt washer reaches a point in its outward movement away from shaft 22 at which it rides a low line engagement on the sloping face 40 of member 38. Now contacts 36—136 and 37—137 will engage and contacts 34—134 and 35—135 separate, the former set of contacts now acting as the fulcrum for further clockwise movement of member 38. A decrease in motor speed below a predetermined operating speed and a consequent decrease of centrifugal force permits spring 52 to move felt washer 54 toward shaft 22 and thus the felt washer, in constant contact with sloping face 40 of member 38 as said motor shaft rotates, forces the member 38 counter-clockwise about the fulcrum 36—136 and 37—137 until contacts 34—134 and 35—135 again engage, at which time 36—136 and 37—137 are separated and 34—134 and 35—135 act as fulcrum for further counterclockwise movement of the member 38.

The control device just described is used on an electric motor having starting and running windings, both of which are energized for motor starting purposes but only one of which, the running winding, is utilized for normal motor operation. The motor drives an air circulating fan 26 in a drying machine as for instance a laundry drier in the drying compartment of which there is provided an electrically energized heater coil 60. Coil 60, when energized, heats the air in the drier compartment and the motor driven fan 26 circulates it so that all laundry within the compartment is equally subjected to the heated air. If, for any reason, the fan operating motor should fail, air circulation would stop and continued operation of the heater coil 60 under such circumstances would prove disastrous and extremely dangerous not only to the laundry within the drier but might also threaten damage to the building in which the drier is operating.

Figure 3:
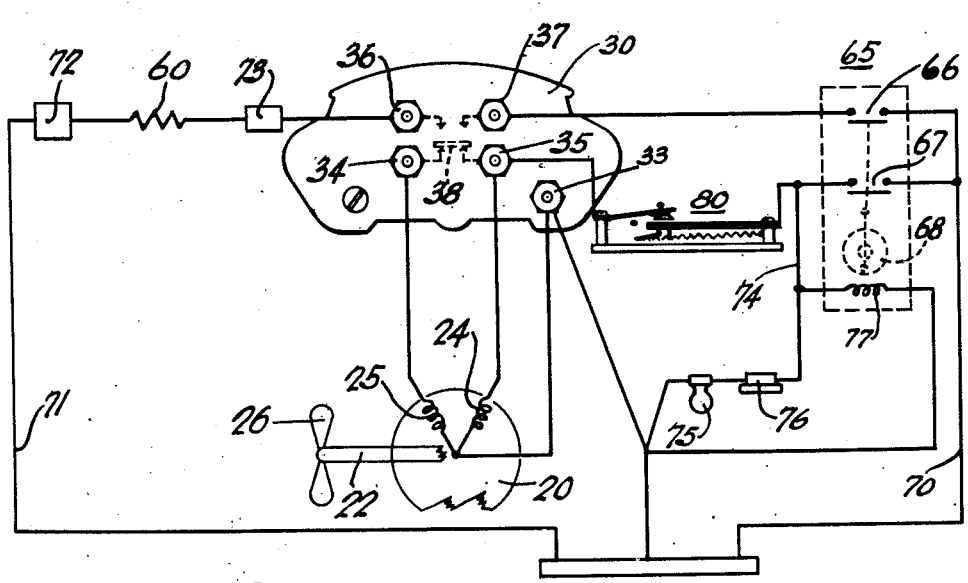
Fig. 3 is a diagrammatic view showing parts of the electric motor and elements of the electric drying machine as connected together electrically and to a power source.

Fig. 3 discloses diagrammatically the various elements of an installation of this kind and their electrical connections. Substantially all elements excepting the main, manual control switch are contained within the heating compartment of the drier, which may be of any suitable design or construction and therefore is not illustrated here.

The master switch designated as a whole by the numeral 65 is of any suitable type purchasable on the open market. Briefly, it comprises two normally open switches 66 and 67, operated simultaneously by a control knob 68 which is combined with an automatic timer operable to cause switches 66 and 67 to remain closed for any desired period of time and then automatically be opened. One side of each switch 66 and 67 is connected to one side 70 of a power line of substantially 230 volts, the other side 71 of this high voltage line being connected through a protective fuse 72 with one end of the heater coil 60, the other end of which is connected with an adjustable thermostat 73 of any suitable design, said thermostat in turn, being connected to the terminal contact 36 of the automatic control switch. The other side of the main switch 66 is connected with the terminal contact 37 of the automatic switch. Thus the terminal contacts 36—37 are in the high voltage, heater coil circuit which is completed automatically by the engagement of contact points 136 and 137 on bridging member 38, with terminal contacts 36 and 37 respectively.

The other side of switch element 67 of the manually operable master switch 65 is connected to a neutral line 74 of substantially 115 volts. Connected in this line there may be a germicidal lamp 75 and any suitable ballast element 76. The electric coil 77, controlling the operation of the automatic timer, is also connected to line 74, as is the terminal contact 35 of the automatic switch. One end of the running winding 24 of the motor 20 is connected to terminal contact 35 and one end of starting winding 25 is connected to the terminal contact 34. The other ends of said running and starting windings 24 and 25 respectively, are connected together and to the terminal post 33 of the automatic switch. This post is electrically connected with the power line 74.

To render the electric motor inoperative in case of abnormal current condition caused by overload, stalling or other abnormalities, a protective device 80 of any suitable design may be connected in the line between the master switch element 67 and the terminal contact 35 of the automatic switch, this device being operative to break the circuit to the motor and render said motor completely inoperative and save it from damage which would result if the abnormality which causes the device to function were permitted to continue.

The entire control apparatus functions as follows: the degree of temperature at which the drier is to operate is set by adjusting the regulating thermostat 73. After the clothes to be dried are placed in the drying compartment, the element 68 is actuated which closes switches 66 and 67. For this particular instance 68 is set, let us say, for a 15 minute operating interval, which means that after 15 minutes have elapsed, the timer will operate automatically to open switches 66 and 67. Closing contact 67 connects line 70 with terminal contact 35 through the protective device 80. The inactive motor will have its centrifugal device in the position as shown in Fig. 1 in which the switch bridging member 38 has its contact points 135 and 134 in engagement with terminal contacts 35 and 34 respectively. Thus current from switch 67 flows from terminal contact 35, its engaging contact point 135 through the member 38, contact point 134 and its engaging contact terminal 34. From terminal 35 current flows through the running winding 24 directly connected with said terminal and from terminal 34 current flows through the starting winding 25. Both these windings, being connected to terminal post 33 and it to the line 74, will complete the circuit to energize both windings 24 and 25 whereby the motor is activated and caused to rotate. During this time of motor starting it will be noted that contact terminals 36 and 37 are not connected together or bridged and thus the circuit through the heater coil 60 is still open. As the speed of the motor increases the centrifugal device including shaft or rod 52 and its weights 53 and fibrous washer 54 are moved radially outwardly of the motor shaft, thus the washer 54, moving over the declining surface 40 permits spring 42 to actuate member 38 clockwise, as regards Fig. 1, when the motor reaches a predetermined operating speed the fibrous washer 54 will have reached a rotary path of travel at which the spring 42 will have moved member 38 about contacts 34—134 and 35—135 as fulcrum to cause engagement of contacts 36—136 and 37—137 which, now acting as fulcrum cause the member 38 to lift its contact points 134—135 out of engagement with their respective cooperating stationary contact terminals 34 and 35 and thereby breaking the circuit between switch 67 and the terminal contact 34. This renders the starting winding deenergized and ineffective and also completes the circuit between switch 66 and the heater coil 60 causing energization of said coil. The running winding 24, not having the automatic switch in circuit therewith, will not be affected by its operation from one position to the other. Only the operation of the manual master switch element 67 or the protective device 80 in case of abnormal conditions controls the running winding 24.

If, at any time, the speed of the electric motor decreases before the proper operating rate, the centrifugal switch including the felt washer 54 will actuate the member 38 to open contact engagement between contacts 36—136 and 37—137 to break the circuit including the heater coil 60 and render it inoperative. This, therefore, prevents damage from overheating or rather concentration of heated air which occurs when the heater coil is permitted to function when the motor fails to drive the air circulating fan in the proper manner.

The protective device 80 may be provided to eliminate recurrent on and off operations of the motor when abnormal conditions do not permit it to function at predetermined operating speeds under the control of the automatic, centrifugally actuated switch. Device 80 when rendered effective by abnormal conditions breaks the motor circuit and renders the motor completely inoperative until reset, which should not be done until the cause of the abnormal operation is removed.

From the aforegoing it will be seen that a drying machine, equipped with the present control mechanism, is completely protected against damage to itself or to its contents inasmuch as the heat producing element thereof cannot function while the motor is at rest or while it is operating at a speed below the required speed properly and safely to circulate the heated air within the heated chamber. When the motor reaches proper operating speed the heater is rendered effective and when the speed of the motor drops below a predetermined rate for any cause whatsoever, the heater is rendered inactive.

While the embodiment of the present invention as herein disclosed, constitutes a preferred form, it is to be understood that other forms might be adopted, all coming within the scope of the claims which follow.

What is claimed is as follows:

1. In combination with an electric heater, of a fan motor having starting and running windings; a spring loaded switch in circuit with both heater and starting winding, yieldably urged solely to close the heater circuit and completely open the starting winding circuit; and a motor driven switch controlling device operative, at motor speeds below a predetermined rate, to hold said switch in heater circuit open position in which the starting winding circuit is closed and to render the switch spring actuable to close the heater circuit and completely open the starting winding circuit when the motor attains and while it operates at a predetermined rate.

2. In combination with an electric heater unit, of a fan motor having starting and running winding circuits; a switch consisting of stationary and movable contacts, one pair of the stationary contacts being in the heater unit circuit, the other pair of stationary contacts in the starting winding circuit; a spring yieldably urging the movable contact into engagement with the contacts in the heater circuit and completely out of engagement with the contacts in the starting winding circuit; a motor speed responsive device driven by the motor, said device engaging the movable contact and holding it in opposition to said spring in engagement with the contacts in the starting winding circuit and out of engagement with the contacts in the heater circuit while the motor is inactive or is operating below a predetermined speed.

3. In combination with an electric heater unit, of a fan motor having starting and running winding circuits; switching means operative under the influence of a spring for closing the electric heater unit circuit and for opening the starting winding circuit; speed responsive means driven by the motor and operative to oppose the spring and maintain the switching means in position to open the heater unit circuit and close the starting winding circuit while the motor is inoperative or operating below a predetermined speed; and means for connecting the switch and the running winding circuit to a source of electric power.

4. In combination with an electric heating unit, of a fan motor having starting and running windings; a pair of stationary contacts in the circuit of the heating unit and the circuit of the starting winding respectively; a bridging element tiltable into one position to bridge only one pair of stationary contacts and into a second position to bridge only the other pair of stationary contacts; a spring yieldably urging the bridging element to bridge the contacts in the heating unit circuit; a centrifugal device driven by the motor, constantly engaging the bridging element and operative to oppose the spring whereby at speeds of the motor below a predetermined rate, said element maintains the heating unit circuit completely open and the running winding circuit closed and, when the motor is operating at a predetermined rate, permits the spring to become effective to close the heating unit circuit and maintain the starting winding circuit completely open; and means operative to connect the pairs of stationary contacts and the running winding in circuit with a source of power.

5. In combination with a heating unit connectible with a source of electric power; of a motor having starting and running winding circuits; a switch, spring actuated to connect the heating unit with the source of power and to disconnect the starting winding circuit therefrom; and a motor actuated centrifugal device operative to actuate the switch in opposition to its spring for closing the starting winding circuit only and opening the heating unit circuit as the motor operates below a predetermined rate.

RALPH K. SHEWMON.

REFERENCES CITED

The following references are of record in the file of this patent:

UNITED STATES PATENTS

| Number | Name | Date |
| --- | --- | --- |
| 1,811,090 | Livingston | June 23, 1931 |
| 2,150,638 | Scott | Mar. 14, 1939 |
| 2,182,977 | Werner | Dec. 12, 1939 |
| 2,196,005 | Bariffi | Apr. 2, 1940 |
| 2,210,853 | Falkenberg | Aug. 6, 1940 |
| 2,346,341 | Werner | Apr. 11, 1944 |